July 15, 1952     H. A. MULLIN     2,603,049
DISK RIPPER PLOW ASSEMBLY
Filed May 2, 1950
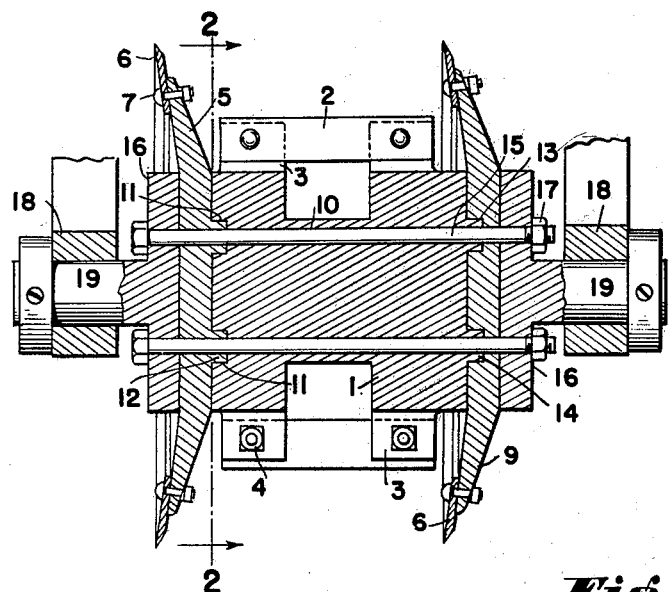
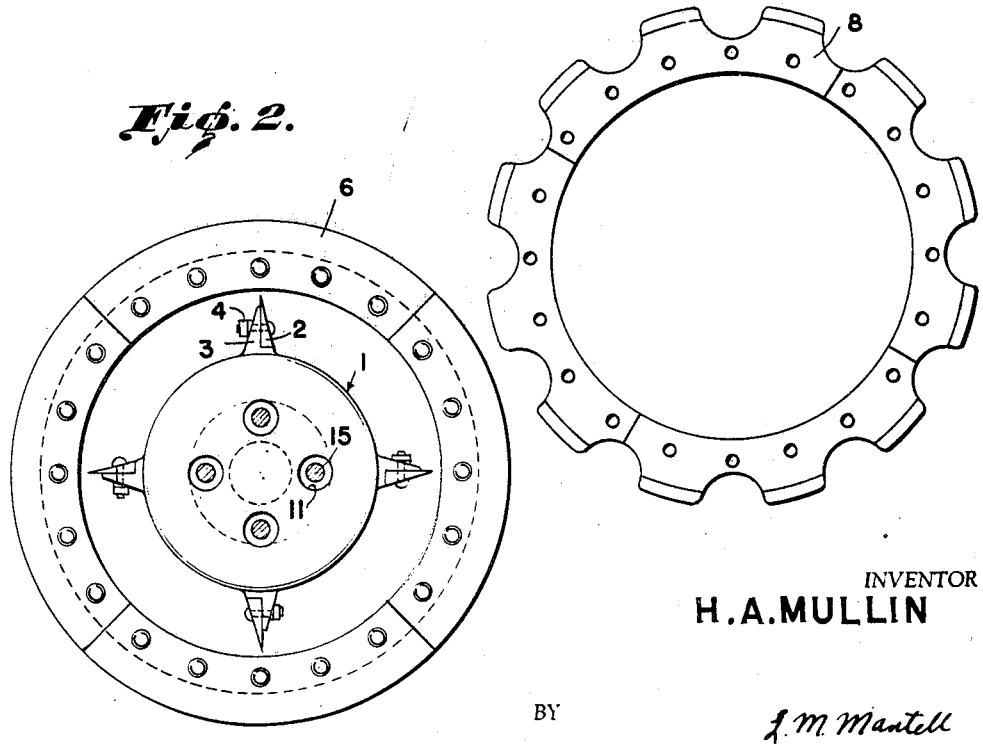
INVENTOR
H. A. MULLIN
BY    J. M. Mantell
ATTORNEY ized April 30, 1928; 370 O. G. 757)

UNITED STATES PATENT OFFICE 2,603,049

DISK RIPPER PLOW ASSEMBLY

Henry A. Mullin, Albuquerque, N. Mex.

Application May 2, 1950, Serial No. 159,566

6 Claims. (Cl. 55—61)

(Granted under the act of March 3, 1883, as amended April 30, 1928; 370 O. G. 757)

The invention herein described may be manufactured and used by or for the Government of the United States of America for governmental purposes throughout the world, without the payment to me of any royalty thereon.

This invention relates to a disc plow. It particularly relates to a disc plow utilizing spacer means of novel design providing for lightness and strength. It also relates to a disc plow having means for spacing the discs which means also serves as a carrier for longitudinal brush cutting knives.

An object of the invention is the provision of a journal-spacer-disc assembly unit of sufficient strength and rigidity to serve without a shaft.

A further object of this invention is the provision of such assembly unit capable of effectively bearing, upon some of the spacers, a series of brush cutting knives.

Other objects will be apparent from the following description.

In the drawings:

Figure 1 is a cross-sectional view of the journal-spacer-disc assembly.

Figure 2 is a side view on line 2—2 of Figure 1.

Figure 3 is a detail of an alternate disc blade.

The unit shown in Figure 1 in part comprises a spacer 1 carrying longitudinal brush knives 2 which are fastened to bosses 3 by nut and bolt units 4. On the left end of the spacer is a disc 5 upon which is mounted a circular cutter 6, being fastened by means of nut and bolt units 7. In Figure 3 is shown an alternate scalloped cutter blade 8 which can be used for cutting in rock in place of cutters 6. On the right end of the spacer (Figure 1) is a disc 9 having a similar cutter 6 attached. The spacer 1 is provided with four longitudinal bores 10. The bore holes on the left are counter-sunk at 11 to provide dowel holes in which the rods or pins 12 of disc 5 seat.

Disc 9 is provided with recesses 13 in which are seated the pins 14 carried by the spacer 1.

Four holding bolts 15 extend through the two journal plates 16, the two discs, and the spacer, being held in place by nuts 17. The entire assembly rotates as a rigid unit in bearings 18, with journals 19 as axial support.

Any required number of the assembly units shown in Figure 1 can be joined by providing each of the journals with an additional plate and attaching additional discs and spacers thereto. Also, intermediate spacers, having a portion of reduced cross-section, may be provided to serve as journals, where assemblies over six feet long are required.

The bosses 3 may be set at an angle, to hold the knives at the required angle.

Spacer 1 may be cored for lightness.

The application of the heavy duty universal disc to a conventional motor patrol would be as follows: an assembly of the disc plow with or without scalloped cutting edges would consist of twelve or more discs. Discs for this type of use would be made of approximately one inch steel at the base and equipped with a removable cutting edge. The assembly may be applied to replace the conventional scarifier, or it can be applied to a motor patrol by replacing the conventional moldboard supported by brackets with bearing attachments. If applied to a motor patrol in this fashion, the disc may be used at all the various angles now obtainable with a conventional moldboard cutting edge or may be reversed at will.

This tool is useful in plowing range land for reseeding, mixing oil mix for oiled road surfaces, making fire lines, cutting rough surfaces from oiled paving, and cutting hard dirt or gravel roadbed surfaces. The advantage in this respect is that the disc will penetrate to almost any desirable depth and remix the fine and coarse material, restoring the road surface materials to their original state.

Having thus described my invention, I claim:

1. A disc plow assembly comprising a solid core spacer having opposite end faces, a plowing disc mounted upon each face, an externally projecting journal having a face plate attached to each disc, a number of off center fastening bolts passing through aligned bores in the face plates, the discs, and throughout the length of the spacer; the bolts serving to hold the assembly together as a unit for rotation on the journals as axis, there being no axial supporting shaft through the discs and spacer, a pin projecting from an end face of the spacer, a recess in the adjacent face of the disc in which the pin seats.

2. A disc plow assembly comprising a substantially solid core spacer block having opposite end faces, a plowing disc mounted upon each face, an externally projecting journal having a face plate attached to each disc, a number of off center fastening bolts passing through aligned bores in the face plates, the discs, and the spacer; the bolts serving to hold the assembly together as a unit for rotation on the journals as axis, there being no axial supporting shaft through the discs and spacer, a pin projecting from a face of one of the discs, a recess in the adjacent face of the spacer in which the pin seats.

3. A disc plow assembly comprising a substantially solid core spacer block having opposite end faces, a plowing disc mounted upon each face, an externally projecting journal having a face plate attached to each disc, a number of off center fastening bolts passing through aligned bores in the face plates, the discs, and the spacer; the bolts serving to hold the assembly together as a unit for rotation on the journal as axis, there being no axial supporting shaft through the discs and spacer, a pin projecting from an end face of the spacer, a recess in the adjacent face of the disc in which the pin seats, the bore for the bolt being through the pin and the recess.

4. A disc plow assembly comprising a substantially solid core spacer block having opposite end faces, a plowing disc mounted upon each face, an externally projecting journal having a face plate attached to each disc, a number of off center fastening bolts passing through aligned bores in the face plates, the discs, and the spacer; the bolts serving to hold the assembly together as a unit for rotation on the journals as axis, there being no axial supporting shaft through the discs and spacer, a pin projecting from a face of one of the discs, a recess in the adjacent face of the spacer in which the pin seats, the bore for the bolt being through the pin and the recess and brush knives mounted upon the spacer block.

5. A disc plow assembly comprising a substantially solid core spacer block having opposite end faces, a plowing disc mounted upon each face, an externally projecting journal having a face plate attached to each disc, a number of off center fastening bolts passing through aligned bores in the face plates, the discs, and throughout the length of the spacer; the bolts serving to hold the assembly together as a unit for rotation on the journals as axis, there being no axial supporting shaft through the discs and spacer, and brush knives mounted upon the spacer.

6. A disc plow assembly comprising a substantially solid core spacer block having opposite end faces, a plowing disc mounted upon each face, an externally projecting journal having a face plate attached to each disc, a number of off center fastening bolts passing through aligned bores in the face plates, the discs, and the spacer; the bolts serving to hold the assembly together as a unit for rotation on the journals as axis, there being no axial supporting shaft through the discs and spacer, and interfitting means on the spacer end faces and adjacent disc faces which in cooperation with the bolts serve to lock the discs and the spacer against rotation with respect to each other.

HENRY A. MULLIN.

REFERENCES CITED

The following references are of record in the file of this patent:

UNITED STATES PATENTS

| Number | Name | Date |
| --- | --- | --- |
| 1,119,143 | Elsas | Dec. 1, 1914 |
| 1,682,468 | Barnes | Aug. 28, 1928 |
| 2,197,424 | Benjamin | Apr. 16, 1940 |